US008684079B2

(12) United States Patent
Wattenbarger et al.

(10) Patent No.: US 8,684,079 B2
(45) Date of Patent: Apr. 1, 2014

(54) USE OF A SOLVENT AND EMULSION FOR IN SITU OIL RECOVERY

(75) Inventors: Robert Chick Wattenbarger, Houston, TX (US); Robert D. Kaminsky, Houston, TX (US); Bhargaw L. Adibhatla, Houston, TX (US)

(73) Assignee: ExxonMobile Upstream Research Company, Houston, TX (US)

( * ) Notice: Subject to any disclaimer, the term of this patent is extended or adjusted under 35 U.S.C. 154(b) by 392 days.

(21) Appl. No.: 13/015,350

(22) Filed: Jan. 27, 2011

(65) Prior Publication Data

US 2011/0226471 A1    Sep. 22, 2011

(30) Foreign Application Priority Data

Mar. 16, 2010 (CA) .................................. 2696638

(51) Int. Cl.
*E21B 43/22* (2006.01)
*E21B 43/25* (2006.01)

(52) U.S. Cl.
USPC ..................................... 166/263; 166/305.1

(58) Field of Classification Search
USPC ............. 166/9, 252, 262, 263, 270, 272, 273, 166/274, 275, 303, 307, 400–402, 403, 166/305.1, 369
See application file for complete search history.

(56) References Cited

U.S. PATENT DOCUMENTS

| | | | |
|---|---|---|---|
| 849,524 A | 4/1907 | Baker | |
| 2,188,012 A | 1/1940 | Stanislaw et al. | |
| 2,412,765 A | 7/1941 | Buddrus | |
| 2,365,591 A | 8/1942 | Ranney | |
| 2,358,183 A | 9/1944 | Povl | |
| 2,655,465 A | 10/1953 | Martin | |
| 3,074,481 A | 1/1963 | Habermann | |
| 3,274,101 A | 1/1964 | West et al. | |
| 3,185,634 A | 5/1965 | Craig, Jr. et al. | |
| 3,323,588 A | 6/1967 | Rai et al. | |
| 3,342,256 A | 9/1967 | Bernard G. et al. | 166/9 |
| 3,434,544 A | 3/1969 | Satter et al. | |
| 3,608,638 A | 9/1971 | Terwilliger | |
| 3,671,419 A | 6/1972 | Ireland et al. | |
| 3,704,990 A | 12/1972 | Sarem et al. | |
| 3,705,625 A | 12/1972 | Whitten et al. | |
| 3,707,189 A | 12/1972 | Prats | |
| 3,739,852 A | 6/1973 | Woods et al. | |
| 3,782,465 A | 1/1974 | Bell et al. | |
| 3,811,503 A | 5/1974 | Burnett et al. | |
| 3,818,989 A * | 6/1974 | Christopher et al. | 166/270.1 |
| 3,823,777 A | 7/1974 | Allen et al. | |
| 3,878,892 A | 4/1975 | Allen et al. | |
| 3,908,762 A | 9/1975 | Redford | |
| 3,945,435 A | 3/1976 | Barry | |
| 3,946,809 A | 3/1976 | Hagedorn | |
| 3,948,319 A | 4/1976 | Pritchett | |
| 3,954,141 A | 5/1976 | Allen et al. | 166/274 |
| 3,956,145 A | 5/1976 | Christopher, Jr. et al. | |
| 3,958,636 A | 5/1976 | Perkins | |
| 3,960,214 A | 6/1976 | Howell et al. | |
| 3,986,557 A | 10/1976 | Striegler et al. | |
| 4,004,636 A | 1/1977 | Brown et al. | |
| 4,007,785 A | 2/1977 | Allen et al. | |
| 4,007,787 A | 2/1977 | Cottle | |
| 4,008,764 A | 2/1977 | Allen | |
| 4,010,799 A | 3/1977 | Kern et al. | |
| 4,017,383 A | 4/1977 | Beavon | |
| 4,017,583 A | 4/1977 | Motojima et al. | |
| 4,020,901 A | 5/1977 | Pisio et al. | |
| 4,026,358 A | 5/1977 | Allen | |
| 4,034,812 A | 7/1977 | Widmyer | |
| 4,037,658 A | 7/1977 | Anderson | |
| 4,067,391 A | 1/1978 | Dewell | |
| 4,085,803 A | 4/1978 | Butler | |
| 4,099,568 A | 7/1978 | Allen | |
| 4,109,720 A * | 8/1978 | Allen et al. | 166/269 |
| 4,125,044 A | 11/1978 | Carrigan et al. | |
| 4,223,728 A | 9/1980 | Pegg | |
| 4,228,853 A | 10/1980 | Harvey et al. | |
| 4,228,854 A | 10/1980 | Sacuta | |

(Continued)

FOREIGN PATENT DOCUMENTS

| | | |
|---|---|---|
| CA | 940853 | 1/1974 |
| CA | 1015656 | 8/1977 |

(Continued)

OTHER PUBLICATIONS

Boberg, T.C. and Lantz, R.B., "Calculation of the Production Rate of a Thermally Stimulated Well", JPT, pp. 1613-1623, Dec. 1966.
Feali, M, et al., "Feasibility Study of the Cyclic VAPEX Process for Low Permeable Carbonate Systems", International Petroleum Technology Conference Paper 12833, 2008.
Lim, G. B., et al., "Cyclic Stimulation of Cold Lake Oil Sand with Supercritical Ethane", SPE Paper 30298, 1995, pp. 521-528.
Lim, G. B., et al., "Three-dimensional Scaled Physical Modeling of Solvent Vapour Extraction of Cold Lake Bitumen", The Journal of Canadian Petroleum Technology, 35(4), pp. 32-40, Apr. 1996.
ASTM D 2887 (1997).

(Continued)

*Primary Examiner* — George Suchfield
(74) *Attorney, Agent, or Firm* — ExxonMobil Upstream Research Company (57) ABSTRACT

Described is a way to reduce solvent usage in solvent-dominated oil recovery processes through the use of an emulsion. Injection of an emulsion into an oil reservoir is performed as an alternative or supplement to solvent injection to minimize solvent usage per unit amount of oil recovered. The emulsion may contain solvent and the solvent may form an external-phase of the emulsion. A solvent-external emulsion may be injected and formed using an aqueous liquid or a gas as the internal phase. The emulsion may be an aqueous-external, vapor-internal emulsion with solvent being injected separately or simultaneously. Polymer may be added to viscosify the emulsions and use them for flow diversion in a solvent-dominated process.

29 Claims, 2 Drawing Sheets

(56) References Cited

U.S. PATENT DOCUMENTS

| | | | |
|---|---|---|---|
| 4,260,019 A * | 4/1981 | Blair, Jr. | 166/400 |
| 4,280,559 A | 7/1981 | Best | 166/303 |
| 4,344,485 A | 8/1982 | Butler | |
| 4,362,213 A | 12/1982 | Tabor | |
| 4,412,585 A | 11/1983 | Bouck | |
| 4,424,866 A | 1/1984 | McGuire | |
| 4,444,261 A | 4/1984 | Islip | 166/272 |
| 4,450,909 A | 5/1984 | Sacuta | |
| 4,456,065 A | 6/1984 | Heim et al. | |
| 4,459,142 A | 7/1984 | Goddin, Jr. | |
| 4,476,928 A | 10/1984 | Green | |
| 4,489,782 A | 12/1984 | Perkins | |
| 4,495,995 A | 1/1985 | Chen et al. | 166/273 |
| 4,510,997 A | 4/1985 | Fitch et al. | |
| 4,513,819 A | 4/1985 | Islip et al. | 166/263 |
| 4,540,050 A | 9/1985 | Huang et al. | 166/272 |
| 4,617,993 A | 10/1986 | Brown | |
| 4,627,495 A * | 12/1986 | Harris et al. | 166/280.1 |
| 4,676,889 A | 6/1987 | Hsieh et al. | |
| 4,678,036 A | 7/1987 | Hartman et al. | |
| 4,687,058 A | 8/1987 | Casad et al. | |
| 4,706,752 A | 11/1987 | Holm | 166/273 |
| 4,819,724 A | 4/1989 | Bou-Mikael et al. | |
| 4,856,588 A | 8/1989 | Borchardt | |
| 4,921,576 A * | 5/1990 | Hurd | 166/270 |
| 4,969,130 A | 11/1990 | Wason et al. | |
| 5,025,863 A | 6/1991 | Haines et al. | |
| 5,027,898 A | 7/1991 | Naae | 166/272 |
| 5,052,487 A | 10/1991 | Wall | |
| 5,060,727 A | 10/1991 | Schramm et al. | 166/252 |
| 5,095,984 A | 3/1992 | Irani | |
| 5,129,457 A | 7/1992 | Sydansk | |
| 5,167,280 A | 12/1992 | Sanchez et al. | |
| 5,174,377 A | 12/1992 | Kumar | |
| 5,236,577 A | 8/1993 | Tipman et al. | |
| 5,246,071 A | 9/1993 | Chu | |
| 5,350,014 A | 9/1994 | McKay | 166/263 |
| 5,358,046 A * | 10/1994 | Sydansk et al. | 166/275 |
| 5,386,875 A | 2/1995 | Venditto et al. | |
| 5,400,430 A | 3/1995 | Nenniger | |
| 5,407,009 A | 4/1995 | Butler et al. | |
| 5,607,016 A | 3/1997 | Butler | |
| 5,674,816 A | 10/1997 | Loree | |
| 5,720,350 A | 2/1998 | McGuire | |
| 5,725,054 A | 3/1998 | Shayegi et al. | |
| 5,771,973 A | 6/1998 | Jensen et al. | |
| 5,826,656 A | 10/1998 | McGuire et al. | |
| 5,855,243 A | 1/1999 | Bragg | 166/275 |
| 5,876,592 A | 3/1999 | Tipman et al. | |
| 5,899,274 A | 5/1999 | Frauenfeld et al. | |
| 5,910,467 A | 6/1999 | Bragg | 507/202 |
| 5,927,404 A | 7/1999 | Bragg | 166/275 |
| 5,968,349 A | 10/1999 | Duyvesteyn et al. | |
| 6,007,709 A | 12/1999 | Duyvesteyn et al. | |
| 6,039,116 A | 3/2000 | Stevenson et al. | |
| 6,068,054 A | 5/2000 | Bragg | 166/270 |
| 6,074,558 A | 6/2000 | Duyvesteyn et al. | |
| 6,214,175 B1 | 4/2001 | Heinemann et al. | |
| 6,214,213 B1 | 4/2001 | Tipman et al. | |
| 6,244,341 B1 | 6/2001 | Miller | |
| 6,318,464 B1 | 11/2001 | Mokrys | |
| 6,357,526 B1 | 3/2002 | Abdel-Halim et al. | |
| 6,358,403 B1 | 3/2002 | Brown et al. | |
| 6,358,404 B1 | 3/2002 | Brown et al. | |
| 6,405,799 B1 | 6/2002 | Vallejos et al. | |
| 6,484,805 B1 | 11/2002 | Perkins et al. | |
| 6,591,908 B2 | 7/2003 | Nasr | |
| 6,662,872 B2 | 12/2003 | Gutek et al. | |
| 6,708,759 B2 | 3/2004 | Leaute et al. | |
| 6,712,215 B2 | 3/2004 | Scheybeler | |
| 6,769,486 B2 | 8/2004 | Lim et al. | |
| 6,782,946 B2 | 8/2004 | Perkins et al. | |
| 6,800,116 B2 | 10/2004 | Stevens et al. | |
| 6,883,607 B2 | 4/2005 | Nenniger et al. | |
| 7,067,811 B2 | 6/2006 | Long et al. | |
| 7,073,837 B2 | 7/2006 | Madlinger | |
| 7,096,092 B1 | 8/2006 | Ramakrishnan et al. | |
| 7,141,162 B2 | 11/2006 | Garner et al. | |
| 7,165,616 B2 | 1/2007 | Jorgensen | |
| 7,165,621 B2 | 1/2007 | Ayoub et al. | |
| 7,234,524 B2 | 6/2007 | Shaw et al. | |
| 7,248,969 B2 | 7/2007 | Patzek et al. | |
| 7,259,688 B2 | 8/2007 | Hirsch et al. | |
| 7,272,973 B2 | 9/2007 | Craig | |
| 7,289,942 B2 | 10/2007 | Yang et al. | |
| 7,294,156 B2 | 11/2007 | Chakrabarty et al. | |
| 7,303,018 B2 | 12/2007 | Cawiezel et al. | 166/307 |
| 7,363,973 B2 | 4/2008 | Nenniger et al. | |
| 7,418,307 B2 | 8/2008 | Katircioglu | |
| 7,434,619 B2 | 10/2008 | Rossi et al. | |
| 7,451,066 B2 | 11/2008 | Edwards et al. | |
| 7,464,756 B2 | 12/2008 | Gates et al. | |
| 7,478,024 B2 | 1/2009 | Gurpinar et al. | |
| 7,527,096 B2 | 5/2009 | Chung et al. | |
| 7,540,951 B2 | 6/2009 | Selmen et al. | |
| 7,546,228 B2 | 6/2009 | Cullick et al. | |
| 7,585,407 B2 | 9/2009 | Duyvesteyn et al. | |
| 7,711,486 B2 | 5/2010 | Thigpen et al. | |
| 7,769,486 B2 | 8/2010 | McHenry et al. | |
| 8,118,096 B2 | 2/2012 | Ayasse | |
| 2002/0007947 A1 | 1/2002 | Patel et al. | |
| 2003/0015321 A1 | 1/2003 | Lim et al. | |
| 2003/0141053 A1 | 7/2003 | Yuan et al. | |
| 2004/0149431 A1 * | 8/2004 | Wylie et al. | 166/242.1 |
| 2005/0150844 A1 | 7/2005 | Hyndman et al. | |
| 2005/0263437 A1 | 12/2005 | Howdeshell | |
| 2006/0113218 A1 | 6/2006 | Hart et al. | |
| 2006/0115221 A1 | 6/2006 | Chalifoux et al. | |
| 2006/0138036 A1 | 6/2006 | Garner et al. | |
| 2006/0138055 A1 | 6/2006 | Garner et al. | |
| 2006/0162922 A1 | 7/2006 | Chung et al. | |
| 2006/0260980 A1 | 11/2006 | Yeung | |
| 2006/0289157 A1 | 12/2006 | Rao | |
| 2007/0106545 A1 | 5/2007 | Jowers et al. | |
| 2007/0108098 A1 | 5/2007 | Flint et al. | |
| 2007/0111903 A1 | 5/2007 | Engel et al. | |
| 2007/0122104 A1 | 5/2007 | Chalifoux et al. | |
| 2007/0179766 A1 | 8/2007 | Cullick et al. | |
| 2007/0187990 A1 | 8/2007 | Shahbazi | |
| 2007/0199710 A1 | 8/2007 | Hocking | |
| 2008/0126168 A1 | 5/2008 | Carney et al. | |
| 2008/0167511 A1 | 7/2008 | Prim | |
| 2008/0262736 A1 | 10/2008 | Thigpen et al. | |
| 2008/0262737 A1 | 10/2008 | Thigpen et al. | |
| 2008/0275796 A1 | 11/2008 | Katircioglu | |
| 2008/0277113 A1 | 11/2008 | Stegemeier et al. | |
| 2008/0294484 A1 | 11/2008 | Furman et al. | |
| 2009/0008270 A1 | 1/2009 | Biswas et al. | |
| 2009/0145606 A1 | 6/2009 | Hocking | |
| 2009/0159277 A1 | 6/2009 | Hocking | |
| 2009/0194282 A1 | 8/2009 | Beer et al. | |
| 2010/0006285 A1 | 1/2010 | Da Silva et al. | |
| 2010/0032348 A1 | 2/2010 | Duyvesteyn et al. | |
| 2010/0147516 A1 | 6/2010 | Betzer-Zilevitch | |
| 2010/0155062 A1 | 6/2010 | Boone et al. | |
| 2010/0218954 A1 | 9/2010 | Yale et al. | |
| 2010/0276341 A1 | 11/2010 | Speirs et al. | |
| 2011/0120717 A1 | 5/2011 | LaMont et al. | |
| 2011/0198086 A1 | 8/2011 | Kwan et al. | |
| 2011/0198091 A1 | 8/2011 | Sirota et al. | |
| 2011/0224907 A1 | 9/2011 | Chalifoux | |
| 2011/0226471 A1 | 9/2011 | Wattenbarger et al. | |
| 2011/0264373 A1 | 10/2011 | Hehmeyer et al. | |

FOREIGN PATENT DOCUMENTS

| | | |
|---|---|---|
| CA | 1059432 | 7/1979 |
| CA | 1122115 | 4/1982 |
| CA | 1246993 | 12/1988 |
| CA | 2043092 | 11/1992 |
| CA | 2058812 | 7/1993 |
| CA | 2108723 | 10/1993 |
| CA | 2108349 | 11/1993 |
| CA | 2075108 | 1/1994 |

(56) References Cited

FOREIGN PATENT DOCUMENTS

| | | | |
|---|---|---|---|
| CA | 2120851 | 8/1995 | |
| CA | 2147079 | 10/1996 | |
| CA | 2232403 | 2/1998 | |
| CA | 2185837 | 3/1998 | |
| CA | 2200899 | 9/1998 | |
| CA | 2232929 | 9/1998 | |
| CA | 2235085 | 10/1999 | |
| CA | 2270703 | 10/2000 | |
| CA | 2312621 | 12/2000 | |
| CA | 2281276 | 2/2001 | |
| CA | 2304938 | 2/2001 | |
| CA | 2243105 | 11/2001 | |
| CA | 2141112 | 11/2002 | |
| CA | 2353109 | 1/2003 | |
| CA | 2310959 | 1/2004 | |
| CA | 2471048 | 3/2004 | |
| CA | 2527058 | 3/2004 | |
| CA | 2505411 | 7/2004 | |
| CA | 2425840 | 10/2004 | |
| CA | 2306016 | 11/2004 | |
| CA | 2349234 | 12/2004 | E21B 43/22 |
| CA | 2435113 | 1/2005 | |
| CA | 2493677 | 6/2005 | |
| CA | 2455011 | 7/2005 | |
| CA | 2462359 | 9/2005 | |
| CA | 2520943 | 4/2006 | |
| CA | 2490734 | 6/2006 | |
| CA | 2494391 | 7/2006 | |
| CA | 2502329 | 9/2006 | |
| CA | 2538464 | 9/2006 | |
| CA | 2521248 | 3/2007 | |
| CA | 2587166 | 9/2007 | |
| CA | 2552482 | 1/2008 | |
| CA | 2630682 | 6/2008 | |
| CA | 2351148 | 7/2008 | |
| CA | 2591354 | 12/2008 | |
| CA | 2332685 | 3/2010 | |
| CA | 2688392 | 6/2011 | |
| CA | 2724806 | 6/2011 | |
| EP | 1355169 | 10/2003 | |
| EP | 2022936 | 2/2009 | |
| RU | 1723314 | 3/1992 | |
| WO | WO99/33936 | 8/1999 | |
| WO | WO 2006/044199 | 4/2006 | |
| WO | WO 2008/009114 | 1/2008 | |
| WO | WO 2008/070990 | 6/2008 | |
| WO | WO 2009/014586 | 1/2009 | |
| WO | WO 2009/061433 | 5/2009 | |
| WO | WO2009067423 | 5/2009 | E21B 43/16 |
| WO | WO 2009/075962 | 6/2009 | |
| WO | WO 2010/039029 | 4/2010 | |

OTHER PUBLICATIONS

Azin et al. (2007) "Investigation of the Vapex Performance in High Pressure Heavy Oil Reservoirs".

Black, L. (2003) "VAPEX- A New Propane Market," *Propane Canada May/Jun.* 2003, http://findarticles.com/p/articles/mi_ga5410/is_200305/ai_n21332180/.

Budd, G. (2007) "New Technology Could Substantially Boost SAGD Potential," *Oil Sands Review*.

Butler, R. M. et al. (1991) "A New Process (VAPEX) for Recovering Heavy Oils Using Hot Water and Hydrocarbon Vapour," *Jrnl. of Canadian Petroleum Tech.*, v. 30, pp. 97-106.

Butler, R. M. et al. (1993) "Recovery of Heavy Oils Using Vapourized Hydrocarbon Solvents: Further Development of the Vapex Process," *Journal of Canadian Petroleum Technology*, Jun. v. 32, No. 6, pp. 56-62.

Cuthiell, D. et al. (2003) "Investigation of the VAPEX Process Using CT Scanning and Numerical Simulation," *Jrnl. of Canadian Petroleum Tech.*, v. 42.2, pp. 41-49.

Cuthiell, D. et al. (2006) "Viscous Fingering Effects in Solvent Displacement of Heavy Oil," *Jrnl. of Canadian Petroleum Tech.*, v. 45.7, pp. 29-39.

Gallant, R. J. et al. (1993) "Steaming and Operating Strategies at a Midlife CSS Operation," *SPE 25794*, pp. 183-194.

Gupta, S. et al. (2001) "Insights into Some Key Issues with Solvent Aided Process," *Petroleum Society-Canadian Institute of Mining, Metallurgy & Petroleum*, Paper No. 2001-126.

Katz et al. (1959) "Handbook of Natural Gas Engineering," *McGraw-Hill*, p. 212.

Nasr, T. N. et al. (1991) "A Novel Scaled Physical Simulator for Horizontal Well Enhanced Oil Recovery," *Petroleum Society of CIM and CANMET*, Paper No. 5.

Rostami, B. et al. (2005) "Investigation of the Vapex Process in High-Pressure Fractured Heavy-Oil Reservoirs," *SPE 97766*, Alberta, Canada.

Sloan, Jr., E. D. (1998) "Clathrate Hydrate of Natural Gases," $2^{nd}$ ed. *Marcel Dekker, Inc. New York*, pp. 162, 170, 200-201, 269, 520.

Turta, A. T. et al. (2004) "Overview of Short-Distance Oil Displacement Processes," *Jrnl. of Canadian Petroleum Tech.*, v. 43, pp. 29-38.

Upreti, S. R. et al. (2007) "Vapor Extraction of Heavy Oil and Bitumen: A Review," *Energy & Fuels*, v. 21, pp. 1562-1574.

Vagnetti, R. et al. (2009) "Solvent Based Oil Recovery for In-Situ Upgrading of Heavy Oil," www.netI.doe.gov/technologies/oil-gas/Petroleum/projects/EP/ImprovedRec/42745SolventEOR.html Vogel, J. V. (1996) "How Solvent Vapors Can Improve Steam Floods," *World Oil*, Nov. 1996, pp. 75-77.

* cited by examiner

USE OF A SOLVENT AND EMULSION FOR IN SITU OIL RECOVERY

CROSS-REFERENCE TO RELATED APPLICATION

This application claims priority from Canadian Patent Application 2,696,638 filed Mar. 16, 2010 entitled USE OF A SOLVENT-EXTERNAL EMULSION FOR IN SITU OIL RECOVERY, the entirety of which is incorporated by reference herein.

FIELD OF THE INVENTION

The present invention relates generally to in situ hydrocarbon recovery. More particularly, the present invention relates to solvent injection in in situ hydrocarbon recovery, including viscous oil.

BACKGROUND OF THE INVENTION

At the present time, solvent-dominated recovery processes (SDRPs) are rarely used to produce highly viscous oil. Highly viscous oils are produced primarily using thermal methods in which heat, typically in the form of steam, is added to the reservoir. Cyclic solvent-dominated recovery processes (CS-DRPs) are a subset of SDRPs. A CSDRP is typically, but not necessarily, a non-thermal recovery method that uses a solvent to mobilize viscous oil by cycles of injection and production. Solvent-dominated means that the injectant comprises greater than 50% by mass of solvent or that greater than 50% of the produced oil's viscosity reduction is obtained by chemical solvation rather than by thermal means. One possible laboratory method for roughly comparing the relative contribution of heat and dilution to the viscosity reduction obtained in a proposed oil recovery process is to compare the viscosity obtained by diluting an oil sample with a solvent to the viscosity reduction obtained by heating the sample.

In a CSDRP, a viscosity-reducing solvent is injected through a well into a subterranean viscous-oil reservoir, causing the pressure to increase. Next, the pressure is lowered and reduced-viscosity oil is produced to the surface through the same well through which the solvent was injected. Multiple cycles of injection and production are used. In some instances, a well may not undergo cycles of injection and production, but only cycles of injection or only cycles of production.

CSDRPs may be particularly attractive for thinner or lower-oil-saturation reservoirs. In such reservoirs, thermal methods utilizing heat to reduce viscous oil viscosity may be inefficient due to excessive heat loss to the overburden and/or underburden and/or reservoir with low oil content.

References describing specific CSDRPs include: Canadian Patent No. 2,349,234 (Lim et al.); G. B. Lim et al., "Three-dimensional Scaled Physical Modeling of Solvent Vapour Extraction of Cold Lake Bitumen", The Journal of Canadian Petroleum Technology, 35(4), pp. 32-40, April 1996; G. B. Lim et al., "Cyclic Stimulation of Cold Lake Oil Sand with Supercritical Ethane", SPE Paper 30298, 1995; U.S. Pat. No. 3,954,141 (Allen et al.); and M. Feali et al., "Feasibility Study of the Cyclic VAPEX Process for Low Permeable Carbonate Systems", International Petroleum Technology Conference Paper 12833, 2008.

The family of processes within the Lim et al. references describes embodiments of a particular SDRP that is also a cyclic solvent-dominated recovery process (CSDRP). These processes relate to the recovery of heavy oil and bitumen from subterranean reservoirs using cyclic injection of a solvent in the liquid state which vaporizes upon production. The family of processes within the Lim et al. references may be referred to as CSP™ processes.

Turning away from solvent-dominated recovery processes for the moment, a background of emulsions will now be provided. Emulsions are mixtures where one fluid phase is dispersed in another. The emulsions typically comprise two immiscible phases. The two immiscible phases include a continuous (or external) phase and a discontinuous (or internal) phase. Oil-water emulsions and water-gas emulsions are the most common types of emulsions. Oil-water emulsions may be either oil-in-water emulsions or water-in oil-emulsions. Emulsions may be stable for long periods of time or be unstable and relatively rapidly separate into stratified phases. Addition of surface active agents may stabilize an emulsion, as the surface-active agent resides at the two-phase interface, reducing surface energy, and providing stability. Foams are special forms of emulsions, where the internal phase is a gas phase and a liquid is the external phase (i.e., the continuous phase). The liquid may be either oil or an aqueous fluid. Foams are also stabilized by the addition of surface-active agents. A three-phase emulsion may also be formed among oil, water, and gas. Also, surface active solids, such as certain clays, may be added to stabilize emulsions.

Some emulsions are thermodynamically stable. Such emulsions are also referred to as "microemulsions", since the internal phase droplets may be very small. Alternatively, so-called "macroemulsions" are not thermodynamically stable and, given sufficient time, will segregate. Such emulsions are said to be kinetically stable. Nevertheless, certain macroemulsions may take months or years to significantly segregate, especially if surface active agents are present. Despite the name, the droplets in a "macroemulsion" may be fairly small, e.g. 0.1-10 microns in diameter. In the following discussion, the term "emulsion" is understood to mean a macroemulsion if not specified as a microemulsion or a thermodynamically-stable emulsion.

Emulsions have been used in oil recovery processes for multiple purposes. In some applications, surface-active agents (i.e., surfactants) have been added to a waterflood operation to form an oil-water emulsion. This is commonly known as a surfactant-flood. A surfactant-flood may be followed by injection of water viscosified with dissolved polymer to provide a more stable displacement front. This process is known as surfactant-polymer flood. In some processes, an alkali may be added to the surfactant to reduce surfactant adsorption, or to generate in situ surfactant by reaction with the oil. This process is called an alkali-surfactant-polymer flood. ("ASP flood"). In all of the above mentioned applications, the surfactant reduces the oil-water interfacial tension forming an emulsion, and this leads to additional oil recovery. Combined chemical agents can produce synergetic action, which not only reduces the amount of the chemical agents used, but also results in higher oil recovery than that obtained by a single chemical drive or two-component combined drive.

Foams in the oil industry are generally used in three different applications. The first application is for blocking the breakthrough of water or gas that is being used as a secondary oil recovery technique by pushing the oil to a receiving well. The foam preferentially flows to zones of relatively higher permeability in the formation and acts to decrease the permeation of the higher permeability zones, in order to block the breakthrough. The second application is for using the foam itself as an agent to push oil to a receiving well in secondary oil recovery. The third application is the use of foams in low density drilling muds to aid in removal of drilling debris.

Certain surfactants, such as certain fluorinated surfactants, can be used for these applications because they can efficiently and effectively foam both water and oil with gas without promoting the formation of liquid-liquid emulsions. Since these surfactants do not participate in liquid-liquid emulsification, less surfactant can be used. Certain fluorinated surfactants are also preferred surfactants in these applications because they remain surface active under the harsh conditions experienced in an oil formation, e.g., high temperature/pressure, high electrolyte concentrations, etc.

The foams produced from using fluorinated surfactants are very stable. However, this stability can be an issue once the foams are recovered on the surface, since it is desirable to break these foams for processing of the produced oils. Another undesirable characteristic of surfactants is that they can leave residue behind on the formation.

As discussed above, a viscosity-reducing solvent is applied to in situ viscous oil to reduce its viscosity and thus can provide a non-thermal mechanism to improve the mobility of the viscous oil. Hydrocarbon solvents include light hydrocarbons such as ethane, propane, or butane or liquid solvents such as pipeline diluents, natural condensate streams, or fractions of synthetic crudes. The diluent can be added to steam and flashed to a vapor state or be maintained as a liquid at elevated temperature and pressure, depending on the particular diluent composition. While in contact with the bitumen, the saturated solvent vapor dissolves into the bitumen.

U.S. Pat. No. 5,350,014 discloses a method for producing heavy oil or bitumen from a formation undergoing thermal recovery. That patent describes a method for producing oil or bitumen in the form of oil-in-water emulsions by carefully maintaining the temperature profile of the swept zone above a minimum temperature.

Further, U.S. Pat. Nos. 5,060,727, 5,027,898, 4,540,050, 4,513,819, 4,444,261, 4,280,559, 5,855,243 and 5,910,467 disclose methods of viscous oil recovery using liquid-liquid or liquid-gas emulsions.

U.S. Pat. No. 3,342,256 claims the recovery of oil from subterranean oil-bearing formations wherein $CO_2$ is introduced into the formation and then driven through the formation from an injection well to a recovery well by means of an aqueous drive liquid, the improvement which comprises disposing a surfactant solution, capable of forming a stable foam under formation conditions, in the formation not later than the introduction of the $CO_2$, and prior to the driving of the $CO_2$ by means of the aqueous drive liquid.

U.S. Pat. No. 4,495,995 claims a process for temporarily plugging permeable portions of a subterranean formation which comprises driving a composition formed by interacting aqueous surfactant solution and $CO_2$ in the form of a dense fluid or a liquid into the permeable portions of the underground formation wherein the subterranean formation is at a pressure in a range of about 700 to about 5000 psi and a temperature in a range of about 50° to about 200° F. The patent also claims introducing into the subterranean formation a drive fluid, and producing recovered oil and drive fluid from at least one additional well penetrating the subterranean formation.

U.S. Pat. No. 4,706,752 claims a method for reducing the permeability of higher permeability zones of an oil bearing subterranean reservoir having heterogeneous permeability and being penetrated by at least one well, the method comprising injecting through a well and into the reservoir an aqueous liquid solution of a water soluble surface active agent; a foam emplacement gas mixture consisting essentially of carbon dioxide and a crude oil-insoluble, noncondensable, non-hydrocarbon gas, the injection being under conditions such that the gas mixture maintains a density between 0.01 and 0.42 grams per centimeter in the reservoir; allowing stable foam to form in the higher permeability zones; diverting subsequently injected gases into lower permeability zones of the reservoir without destroying the stable foam; and producing oil from the reservoir. Similarly, U.S. Pat. No. 5,105,884 claims a process for improving sweep efficiency in subterranean oil-bearing formations requiring regions of high and low permeability.

U.S. Pat. No. 5,927,404 describes a method of using the solids-stabilized emulsion as a drive fluid to displace hydrocarbons for enhanced oil recovery. U.S. Pat. No. 5,855,243 claims a similar method of using a solids-stabilized emulsion, whose viscosity is reduced by the addition of a gas, as a drive fluid. U.S. Pat. No. 5,910,467 claims solids-stabilized emulsion described in U.S. Pat. No. 5,855,243. U.S. Pat. No. 6,068,054 describes a method for using solids-stabilized emulsion as a barrier for diverting the flow of fluids in the formation.

Use of emulsified aqueous acids for stimulating reservoirs is known in the art. For example, U.S. Pat. No. 7,303,018 describes a method of acidizing a subterranean formation where, in some embodiments, a strong acid is emulsified within an oil.

A problem that remains in solvent-dominated in situ oil recovery, is to maximize extraction of oil from oil reservoirs, including viscous oil reservoirs with maximum economy, minimizing solvent usage, minimum loss of solvent in the reservoir, and to leave minimal residual oil in the oil reservoirs. Solvent recovery remains an important component of process economics, and a need continues to exist for an improved method to minimize solvent use while maximizing oil recovery.

SUMMARY OF THE INVENTION

It is an object of the present invention to obviate or mitigate at least one disadvantage of previous processes.

In one aspect, the present invention provides a way to reduce solvent usage in solvent-dominated hydrocarbon recovery processes through the use of an emulsion. Injection of an emulsion into an oil reservoir is performed as an alternative or supplement to solvent injection to minimize solvent usage per unit amount of oil recovered. In some embodiments the emulsion contains solvent. In some embodiments the external-phase of the emulsion comprises solvent. In such embodiments, the internal phase of the solvent-external emulsion may be an aqueous liquid or a gas. In some embodiments, the emulsion is an aqueous-external, vapor-internal emulsion with solvent being injected separately or simultaneously.

In one aspect, the present invention provides a method of recovering hydrocarbons from an underground reservoir of the hydrocarbons, the method comprising:

(a) injecting fluid into the reservoir, comprising an emulsion and a viscosity-reducing solvent, (b) allowing the solvent to contact and at least partially dissolve into the hydrocarbons in the reservoir and reduce the viscosity of the hydrocarbons; and (c) producing reduced viscosity hydrocarbons, the solvent having a viscosity at reservoir pressure and temperature less than 1% of the viscosity of the hydrocarbons at the same pressure and temperature, the emulsion having an internal phase and an external phase, and the internal phase being substantially chemically inert with respect to components in the reservoir.

In certain embodiments, the following features may be present.

At least 25 mass %, or at least 50 mass %, of the solvent in step (a) may enter the reservoir as a liquid.

At least 50 mass %, or at least 75 mass %, of the injected fluid excluding the internal phase of injected emulsion may comprise viscosity-reducing solvent.

The injected solvent may form part of the injected emulsion.

The external phase of the emulsion may comprise the solvent.

The hydrocarbons may be a viscous oil having a viscosity of at least 10 cP (centipoise) at initial reservoir conditions.

The solvent may comprise ethane, propane, butane, pentane, heptane, hexane, octane, nonane, gas-condensate, a fraction of the reservoir hydrocarbons, carbon dioxide, or a combination thereof. The solvent may comprise ethane, propane, butane, pentane, carbon dioxide, or a combination thereof. The solvent may comprise greater than 50 mass % propane.

The internal phase of the emulsion may comprise an aqueous liquid. The internal phase may have a pH between 5.0 and 9.0. The aqueous liquid may comprise brine produced from the reservoir.

The internal phase of the emulsion may comprise a gas in a vapor state in the reservoir. The gas may comprise $N_2$, $CO_2$, methane, or natural gas.

The internal phase of the emulsion may comprise at least 10 vol % of the emulsion at a pressure and temperature condition within the reservoir.

At least 80 vol % of the internal phase of the emulsion may comprise droplets or bubble inclusions less than 5 microns in diameter.

The emulsion may be at least partially stabilized through an addition of a surfactant, or through an addition of clay or silica particles of less than 1 micron in maximum particle length, or through an addition of asphaltenes or an asphaltic fraction obtained from recovered oil.

The external phase of the emulsion may comprise a polymer to increase a viscosity of the emulsion.

The injection of the emulsion may be effected in alternating fashion with injection of a non-emulsified viscosity-reducing solvent. The injection of the emulsion may be effected after injection of a non-emulsified viscosity-reducing solvent. The non-emulsified solvent may have a different composition than solvent in the emulsion.

The hydrocarbon recovery may be by a cyclic solvent-dominated recovery process. The injection of the emulsion may be effected at the end of non-emulsified solvent injection cycles.

The hydrocarbon recovery may be by a cyclic solvent-dominated recovery process comprising injecting the emulsion and the solvent into a well completed in the reservoir, and then halting injection, and then producing at least a fraction of the emulsion, the solvent, and the hydrocarbons from the reservoir, and then halting production, and then repeating such cycles of injection and production. The injection and production may be effected through a common wellbore. The cyclic solvent-dominated recovery process may be a non-thermal recovery process.

The hydrocarbon recovery may be through a non-cyclic solvent-dominated recovery process.

The emulsion may be an aqueous-external, vapor-internal emulsion.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The term "viscous oil" as used herein means a hydrocarbon, or mixture of hydrocarbons, that occurs naturally and that has a viscosity of at least 10 cP (centipoise) at initial reservoir conditions. Viscous oil includes oils generally defined as "heavy oil" or "bitumen". Bitumen is classified as an extra heavy oil, with an API gravity of about 10° or less, referring to its gravity as measured in degrees on the American Petroleum Institute (API) Scale. Heavy oil has an API gravity in the range of about 22.3° to about 10°. The terms viscous oil, heavy oil, and bitumen are used interchangeably herein since they may be extracted using similar processes.

In situ is a Latin phrase for "in the place" and, in the context of hydrocarbon recovery, refers generally to a subsurface hydrocarbon-bearing reservoir. For example, in situ temperature means the temperature within the reservoir. In another usage, an in situ oil recovery technique is one that recovers oil from a reservoir within the earth.

The term "formation" as used herein refers to a subterranean body of rock that is distinct and continuous. The terms "reservoir" and "formation" may be used interchangeably.

During a CSDRP, a reservoir accommodates the injected solvent and non-solvent fluid by compressing the pore fluids and, more importantly in some embodiments, by dilating the reservoir pore space when sufficient injection pressure is applied. Pore dilation is a particularly effective mechanism for permitting solvent to enter into reservoirs filled with viscous oils when the reservoir comprises largely unconsolidated sand grains. Injected solvent fingers into the oil sands and mixes with the viscous oil to yield a reduced viscosity mixture with significantly higher mobility than the native viscous oil. Without intending to be bound by theory, the primary mixing mechanism is thought to be dispersive mixing, not diffusion. Preferably, injected fluid in each cycle replaces the volume of previously recovered fluid and then adds sufficient additional fluid to contact previously uncontacted viscous oil. Preferably, the injected fluid, excluding the internal phase of injected emulsions, comprises greater than 50% by mass of solvent.

On production, the pressure is reduced and the solvent(s), non-solvent injectant, and viscous oil flow back to the same well and are produced to the surface. As the pressure in the reservoir falls, the produced fluid rate declines with time. Production of the solvent/viscous oil mixture and other injectants may be governed by any of the following mechanisms: gas drive via solvent vaporization and native gas exsolution, compaction drive as the reservoir dilation relaxes, fluid expansion, and gravity-driven flow. The relative importance of the mechanisms depends on static properties such as solvent properties, native GOR (Gas to Oil Ratio), fluid and rock compressibility characteristics, and reservoir depth, but also depends on operational practices such as solvent injection volume, producing pressure, and viscous oil recovery to-date, among other factors.

During an injection/production cycle, the volume of produced oil should be above a minimum threshold to economically justify continuing operations. In addition to an acceptably high production rate, the oil should also be recovered in an efficient manner. One measure of the efficiency of a CSDRP is the ratio of produced oil volume to injected solvent volume over a time interval, called the OISR (produced Oil to Injected Solvent Ratio). Typically, the time interval is one complete injection/production cycle. Alternatively, the time interval may be from the beginning of first injection to the present or some other time interval. When the ratio falls below a certain threshold, further solvent injection may become uneconomic, indicating the solvent should be injected into a different well operating at a higher OISR. The exact OISR threshold depends on the relative price of viscous oil and solvent, among other factors. If either the oil production rate or the OISR becomes too low, the CSDRP may be discontinued. Even if oil rates are high and the solvent use is efficient, it is also important to recover as much of the injected solvent as possible if it has economic value. The remaining solvent may be recovered by producing to a low pressure to vaporize the solvent in the reservoir to aid its recovery. One measure of solvent recovery is the percentage of solvent recovered divided by the total injected. In addition, rather than abandoning the well, another recovery process may be initiated. To maximize the economic return of a producing oil well, it is desirable to maintain an economic oil production rate and OISR as long as possible and then recover as much of the solvent as possible.

The OISR is one measure of solvent efficiency. Those skilled in the art will recognize that there are a multitude of other measures of solvent efficiency, such as the inverse of the OISR, or measures of solvent efficiency on a temporal basis that is different from the temporal basis discussed in this disclosure. Solvent recovery percentage is just one measure of solvent recovery. Those skilled in the art will recognize that there are many other measures of solvent recovery, such as the percentage loss, volume of unrecovered solvent per volume of recovered oil, or its inverse, the volume of produced Oil to Volume of Lost Solvent Ratio (OLSR).

Solvent Composition

The solvent may be a light, but condensable, hydrocarbon or mixture of hydrocarbons comprising ethane, propane, or butane. Additional injectants may include $CO_2$, natural gas, $C_{3+}$ hydrocarbons, ketones, and alcohols. Non-solvent co-injectants may include steam, hot water, or hydrate inhibitors. Viscosifiers may be useful in adjusting solvent viscosity to reach desired injection pressures at available pump rates and may include diesel, viscous oil, bitumen, or diluent. Viscosifiers may also act as solvents and therefore may provide flow assurance near the wellbore and in the surface facilities in the event of asphaltene precipitation or solvent vaporization during shut-in periods. Carbon dioxide or hydrocarbon mixtures comprising carbon dioxide may also be desirable to use as a solvent.

In one embodiment, the solvent comprises greater than 50% $C_2$-$C_5$ hydrocarbons on a mass basis. In one embodiment, the solvent is primarily propane, optionally with diluent, when it is desirable, to adjust the properties of the injectant to improve performance. Alternatively, wells may be subjected to compositions other than these main solvents to improve well pattern performance, for example $CO_2$ flooding of a mature operation.

Phase of Injected Solvent

In one embodiment, the solvent is injected into the well at a pressure in the underground reservoir above a liquid/vapor phase change pressure such that at least 25 mass % of the solvent enters the reservoir in the liquid phase. Alternatively, at least 50, 70, or even 90 mass % of the solvent may enter the reservoir in the liquid phase. Injection as a liquid may be preferred for achieving high pressures because pore dilation at high pressures is thought to be a particularly effective mechanism for permitting solvent to enter into reservoirs filled with viscous oils when the reservoir comprises largely unconsolidated sand grains. Injection as a liquid also may allow higher overall injection rates than injection as a gas.

In an alternative embodiment, the solvent volume is injected into the well at rates and pressures such that immediately after halting injection into the injection well at least 25 mass % of the injected solvent is in a liquid state in the underground reservoir. Injection as a vapor may be preferred in order to enable more uniform solvent distribution along a horizontal well. Depending on the pressure of the reservoir, it may be desirable to significantly heat the solvent in order to inject it as a vapor. Heating of injected vapor or liquid solvent may enhance production through mechanisms described by Boberg, T. C. and Lantz, R. B., "Calculation of the production of a thermally stimulated well", JPT, 1613-1623, December 1966. Towards the end of the injection cycle, a portion of the injected solvent, perhaps 25% or more, may become a liquid as pressure rises. Because no special effort is made to maintain the injection pressure at the saturation conditions of the solvent, liquefaction would occur through pressurization, not condensation. Downhole pressure gauges and/or reservoir simulation may be used to estimate the phase of the solvent and other co-injectants at downhole conditions and in the reservoir. A reservoir simulation is carried out using a reservoir simulator, a software program for mathematically modeling the phase and flow behavior of fluids in an underground reservoir. Those skilled in the art understand how to use a reservoir simulator to determine if 25% of the injectant would be in the liquid phase immediately after halting injection. Those skilled in the art may rely on measurements recorded using a downhole pressure gauge in order to increase the accuracy of a reservoir simulator. Alternatively, the downhole pressure gauge measurements may be used to directly make the determination without the use of reservoir simulation.

Although preferably a CSDRP is predominantly a non-thermal process in that heat is not used principally to reduce the viscosity of the viscous oil, the use of heat is not excluded. Heating may be beneficial to improve performance, improve process start-up, or provide flow assurance during production. For start-up, low-level heating (for example, less than 100° C.) may be appropriate. Low-level heating of the solvent prior to injection may also be performed to prevent hydrate formation in tubulars and in the reservoir. Heating to higher temperatures may benefit recovery.

In one embodiment, the present invention provides a method of recovering hydrocarbons, including viscous oil (e.g., heavy oil or bitumen) from an underground reservoir of the hydrocarbons by injecting a solvent-external emulsion into the reservoir, allowing the solvent to contact and dissolve into the hydrocarbons thereby reducing its viscosity, and producing reduced-viscosity hydrocarbons from the reservoir.

The benefits of emulsion use may include the following: (1) the emulsion can be used to modify the viscosity of the injected solvent to aid mobility and distribution control, and (2) the emulsion can be used to lower the cost per unit reservoir volume of injectant-rich regions in the reservoir by minimizing the volume of solvent injected which simply fills pore space and contacts little oil. Emulsion systems typically have viscosities greater than the viscosity of the external phase in a non-emulsified state.

Suitable solvents for the emulsion may comprise $CO_2$, hydrocarbons of $C_2$, $C_3$, $C_4$, $C_5$, $C_6$, $C_7$, $C_8$, or $C_9$, gas-condensate, a fraction of the reservoir oil, and mixtures thereof. Preferably the solvent has a liquid-phase viscosity less than 1% of the native hydrocarbons to be recovered at in situ temperature and pressure conditions. The lighter species of this group may require confining pressure, as exists in deeper reservoirs, to maintain the solvent in a liquid state. Use of such species, however, may be preferable because late in the life of a reservoir oil recovery project, it may be desirable to reduce the pressure of the reservoir to vaporize the solvent and recover the bulk of it, that is, "blow down" the reservoir. Viscosifiers may be used to adjust the solvent viscosity to reach the desired injection pressures, such as diesel, viscous oil, bitumen, diluent, or polymers.

In some embodiments, the injected emulsion may be a mixture of two or more immiscible liquids (e.g., a hydrocarbon solvent and water or brine). In other embodiments, the injected emulsion may be a mixture of a hydrocarbon solvent and gas (i.e. to form a foam). The gas may comprise $CO_2$, nitrogen, methane, natural gas, or fraction of natural gas. Preferably the internal phase of the injected emulsion is substantially chemically inert with respect to components found in the reservoir, especially the reservoir rock. That is, the internal phase is primarily a "filler" rather than an active agent. For example, an internal aqueous phase may have a near-neutral pH of between 5.0 and 9.0 or between 6.0 and 8.0.

In some embodiments, the injected solvent-external emulsion is used in a solvent-dominated recovery process, examples of which are described in the background section. In some embodiments, the recovery process is a CSDRP, and may be, but is not limited to, CSP™ processes. Applying this process to a CSDRP, the emulsion is injected in a cyclic manner similar to the base solvent-only process. The viscosity, stability, and water-content of the emulsion may be tuned to maximize the benefit of reduced solvent storage, while allowing proper solvent-oil mixing at the solvent-chamber front and allowing the solvent to be recovered at the end of the recovery process.

Figure 1:
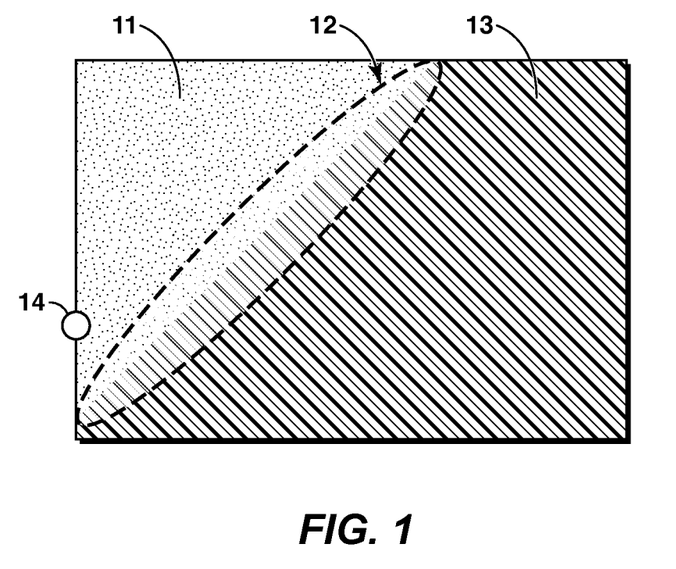
FIG. 1 illustrates, in vertical cross-section, a cyclic approach to oil recovery using solvent injection.
Figure 2:
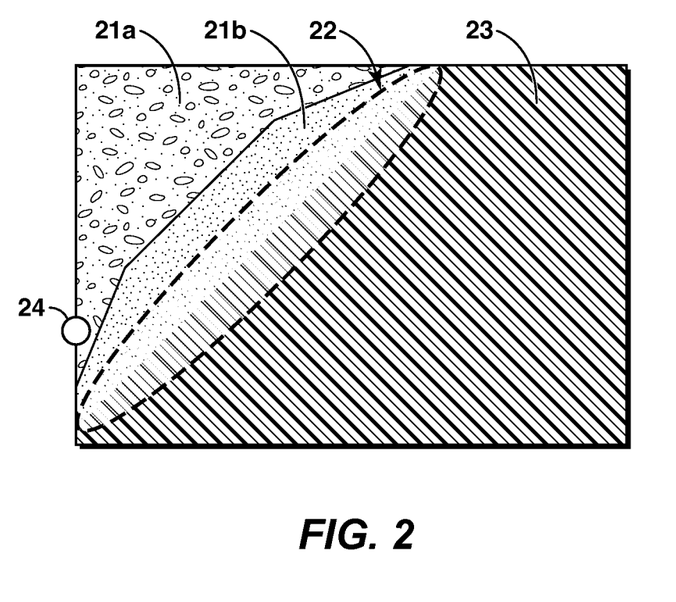
FIG. 2 illustrates, in vertical cross-section, a solvent-external emulsion approach to oil recovery in accordance with a disclosed embodiment.

FIGS. 1 and 2 illustrate a benefit of this process for a solvent-dominated recovery process (SDRP) where the viscous oil is produced in part through gravity drainage and where cyclic injection and production is used. FIG. 1 illustrates, in vertical cross-section, a cyclic approach using solvent as the injectant. A solvent chamber (11) exists above native viscous oil (13). The solvent chamber sits above the oil since its density is less than the density of the native oil. A solvent-viscous oil mixing zone, or drainage zone which is illustrated in FIG. 1 as the area within oval dashed line (12), is situated between the solvent chamber and native viscous oil, where the solvent and oil mix and the oil viscosity is reduced sufficiently to allow it to drain at a commercial rate to the producer well (14). The producer well (14), which also acts as the solvent injector, is shown to be a horizontal well directed into the page.

FIG. 2 illustrates an embodiment of the instant invention. This embodiment is similar to that in FIG. 1 except that a liquid-liquid or liquid-gas emulsion zone sits at the top (21a). The zone has reduced solvent in it as compared to the FIG. 1 case due to the presence of an internal phase. Near the oil interface, a zone of high solvent content (21b) may exist, but does not necessarily exist, due to the presence of the native oil partially breaking the emulsion or natural instabilities in the emulsion leading to partial segregation of the internal and external phases. Solvent from the emulsion contacts and reduces the viscosity of the native oil in the solvent viscous oil mixing zone (which is illustrated in FIG. 2 as the area within dashed oval (22) leading to gravity drainage towards the production well on the lower left side. The injector/producer well (24) and the viscous oil zone (23) are also shown. In some embodiments non-emulsified fluid may be injected with, before, or subsequent to the emulsion. In any event, sufficient total fluid (emulsified and non-emulsified) is injected to substantially fill pore space previously depleted of fluids. For example, this pore space may be a chamber formed in a prior cycle of CSDRP. Substantial filling may be determined by injecting an in situ fluid volume of at least 90% of a previously produced in situ volume of native fluids. Alternatively, substantial filling may be determined by monitoring injection pressure and estimating an in situ pressure. Substantial filling may be inferred if the estimated in situ pressure increases beyond a specified pressure, e.g., an original reservoir pressure, an unconsolidated sand dilation pressure, and a fraction (e.g., 75-100%) of a minimum in situ confining stress.

Figure 3:
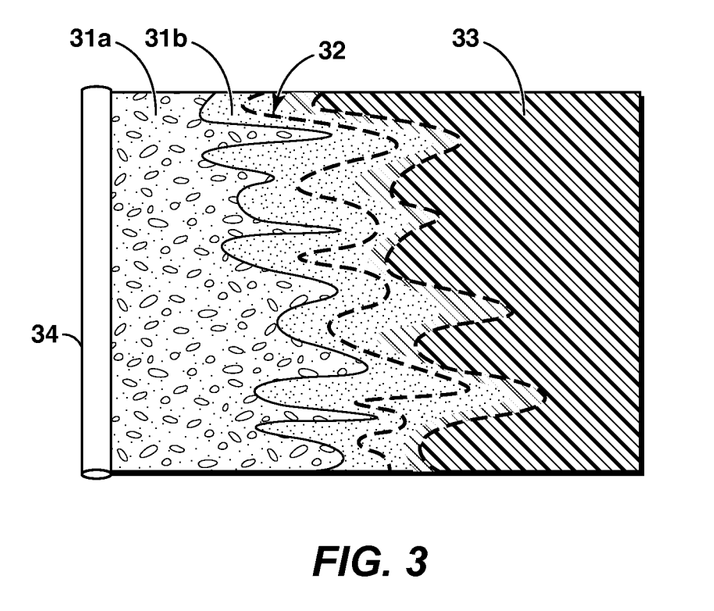
FIG. 3 illustrates, in horizontal cross-section, a solvent-external emulsion approach to oil recovery in accordance with a disclosed embodiment.

FIG. 3 illustrates, in horizontal cross-section, the same solvent-external emulsion approach to oil recovery shown in FIG. 2. A horizontal cross-section allows appreciation of the role of solvent in the mixing zone within the viscous fingers that may form when a low viscosity solvent is injected into high viscosity oil. FIG. 3 is a horizontal cross-section (also known as a top view) of a portion of a reservoir pierced by a long horizontal well (34). The emulsion zone (31a) occupies the majority of the invaded pore space. Because the emulsion occupies the majority of the previously invaded pore space, a substantial reduction in the volume of solvent injected per unit of oil recovered may be obtained. Near the oil interface, a zone of high solvent content (31b) may exist. Solvent from the emulsion contacts and reduces the viscosity of the native oil in the solvent-oil mixing zone (32) located within the viscous fingers. Because most of the first solvent/bitumen contact and subsequent mixing occurs within the fingers, it is important that high solvent concentrations be realized within the fingers. The un-invaded viscous oil zone (33) is also shown.

Figure 4:
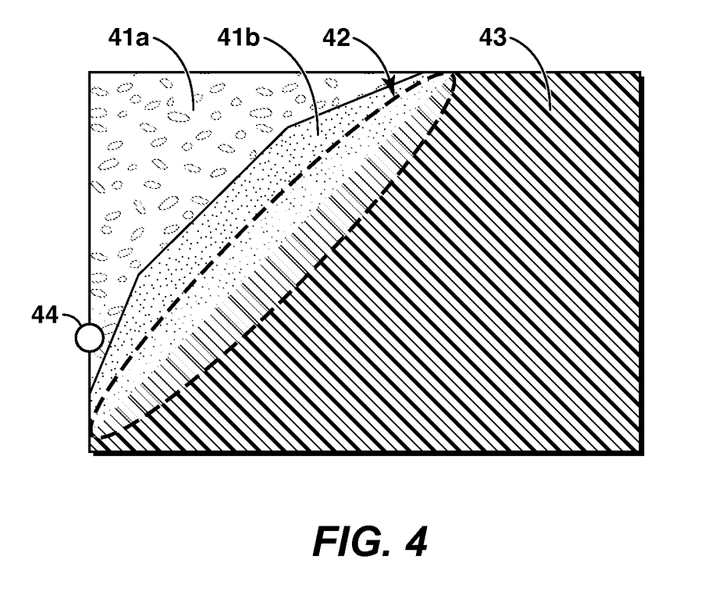
FIG. 4 illustrates, in vertical cross-section, a cyclic solvent-emulsion process at the end of a solvent injection cycle that began with pure solvent injection, followed by a chase emulsion injectant, which may or may not contain solvent.

In another embodiment, emulsions are selectively used during the injection cycles, either in an emulsion-alternating-solvent (similar to a water-alternating-gas (WAG) injection) manner, or as a chase injectant to pure solvent in each cycle, or in certain cycles. This option is illustrated in FIG. 4. FIG. 4 shows a cyclic solvent-emulsion process at the end of a solvent injection cycle that began with pure solvent injection, followed by a chase emulsion injectant, which may or may not contain solvent. As shown, region (41a) is the emulsion region that is behind the solvent-oil mixing zone (42). A solvent-rich zone (41b), formed from solvent injected prior to injection of the emulsion, may be between the emulsion region and the solvent-oil mixing zone. In the configuration shown, the emulsion would preferably be more viscous and less dense than the pure solvent, so that solvent-oil mixtures would be preferentially produced during the production cycle. The injector/producer well (44) and the viscous oil zone (43) are also shown.

For field application, it is preferable to generate the emulsion at the surface prior to injection using a continuous system to generate the emulsion. Such a method may use flow through narrow gaps adjacent to rotating surfaces (e.g., colloid mills), bladed stirrers, or high-pressure nozzles (e.g., homogenizers). Emulsion quality is generally improved by using several stages of emulsion generation (e.g., several mixers in series) where the internal phase fluid is added at more than one stage.

For the process to have significant benefit, the internal phase should comprise a significant portion of the injected emulsion. For example, the internal phase should comprise at least 10 vol %, 20 vol %, or even 30 vol % of the injected emulsion at reservoir pressure and temperature conditions. Since the injected emulsions pass through the porous media of the reservoir, the internal phase inclusions should be of a size on the order of the pores and pore throats of the reservoir rock. For example, at least 80 vol % of the internal phase in the emulsion may be associated with droplets or bubble inclusions that may be less than 5 microns in diameter.

Depending on the solvent that is used, different methods may be used to help stabilize the solvent-water emulsions. These include surface active solid particle additions or surfactant additions. In some embodiments, clay or silica particles less than 1 micron in the longest extent may be used as the surface active solid particles.

In some embodiments, emulsions may be injected into the reservoir after non-emulsified solvent has been used for a period of time to recover a portion of the viscous oil in the reservoir. In this context, use of liquid-gas emulsions (i.e., foams) may be particularly useful for diverting subsequent injection of solvent or solvent-external emulsions into regions not already well-swept of viscous oil. Solvent injected in a non-emulsified state may differ in composition from one chosen to inject in an emulsified state.

In some embodiments, water or aqueous foams (i.e., water-external water-gas emulsions) may be injected to help divert subsequent injectants towards unrecovered viscous oil and minimize the pore volume necessary to be filled by more costly solvents or solvent-external emulsions. Such water or aqueous foam injections may be performed as one-time or periodic slugs of injectant. In addition to surfactants to stabilize aqueous foams, polymer may be added to control the foam viscosity and strength. Added polymers may include polyacrylamides, polysacchirides, polyakylene oxides, or cellulose ethers in concentrations ranging from 10 ppm to 10,000 ppm.

In some embodiments, especially liquid-gas emulsions (i.e., foams), it may be beneficial to add polymer to the liquid phase to increase the viscosity of the emulsion.

The choice of liquid-internal or gas-internal emulsions may depend on availability of water versus gas. In certain areas, pressurized gas (e.g., nitrogen) may be expensive to produce or obtain (e.g., natural gas). In other areas, water may be in short supply.

Table 1 outlines the operating ranges for CSDRPs of some embodiments. The present invention is not intended to be limited by such operating ranges.

TABLE 1

Operating Ranges for a CSDRP.

| Parameter | Broader Embodiment | Narrower Embodiment |
|---|---|---|
| Injectant volume | Fill-up estimated pattern pore volume plus 2-15% of estimated pattern pore volume; or inject, beyond a pressure threshold, for a period of time (e.g. weeks to months); or inject, beyond a pressure threshold, 2-15% of estimated pore volume. | Inject, beyond a pressure threshold, 2-15% (or 3-8%) of estimated pore volume. |
| Injectant composition, main | Main solvent (>50 mass %) $C_2$-$C_5$. Alternatively, wells may be subjected to compositions other than main solvents to improve well pattern performance (i.e. $CO_2$ flooding of a mature operation or altering in-situ stress of reservoir). | Main solvent (>50 mass %) is propane ($C_3$). |
| Injectant composition, additive | Additional injectants may include $CO_2$ (up to about 30%), $C_{3+}$, viscosifiers (e.g. diesel, viscous oil, bitumen, diluent), ketones, alcohols, sulphur dioxide, hydrate inhibitors, and steam. | Only diluent, and only when needed to achieve adequate injection pressure. |
| Injectant phase & Injection pressure | Solvent injected such that at the end of injection, greater than 25% by mass of the solvent exists as a liquid in the reservoir, with no constraint as to whether most solvent is injected above or below dilation pressure or fracture pressure. | Solvent injected as a liquid, and most solvent injected just under fracture pressure and above dilation pressure, $P_{fracture} > P_{injection} > P_{dilation} > P_{vaporP}$. |
| Injectant temperature | Enough heat to prevent hydrates and locally enhance wellbore inflow consistent with Boberg-Lantz mode | Enough heat to prevent hydrates with a safety margin, $T_{hydrate} + 5°$ C. to $T_{hydrate} + 50°$ C. |
| Injection rate | 0.1 to 10 m³/day per meter of completed well length (rate | 0.2 to 2 m³/day per meter of completed well length (rate |

TABLE 1-continued

Operating Ranges for a CSDRP.

| Parameter | Broader Embodiment | Narrower Embodiment |
| --- | --- | --- |
| | expressed as volumes of liquid solvent at reservoir conditions). | expressed as volumes of liquid solvent at reservoir conditions). Rates may also be designed to allow for limited or controlled fracture extent, at fracture pressure or desired solvent conformance depending on reservoir properties. |
| Threshold pressure (pressure at which solvent continues to be injected for either a period of time or in a volume amount) | Any pressure above initial reservoir pressure. | A pressure between 90% and 100% of fracture pressure. |
| Well length | As long of a horizontal well as can practically be drilled; or the entire pay thickness for vertical wells. | 500 m-1500 m (commercial well). |
| Well configuration | Horizontal wells parallel to each other, separated by some regular spacing of 60-600 m; Also vertical wells, high angle slant wells & multi-lateral wells. Also infill injection and/or production wells (of any type above) targeting bypassed hydrocarbon from surveillance of pattern performance. | Horizontal wells parallel to each other, separated by some regular spacing of 60-320 m. |
| Well orientation | Orientated in any direction. | Horizontal wells orientated perpendicular to (or with less than 30 degrees of variation) the direction of maximum horizontal in-situ stress. |
| Minimum producing pressure (MPP) | Generally, the range of the MPP should be, on the low end, a pressure significantly below the vapor pressure, ensuring vaporization; and, on the high-end, a high pressure near the native reservoir pressure. For example, perhaps 0.1 MPa-5 MPa, depending on depth and mode of operation (all-liquid or limited vaporization). | A low pressure below the vapor pressure of the main solvent, ensuring vaporization, or, in the limited vaporization scheme, a high pressure above the vapor pressure. At 500 m depth with pure propane, 0.5 MPa (low)-1.5 MPa (high), values that bound the 800 kPa vapor pressure of propane. |
| Oil rate | Switch to injection when rate equals 2 to 50% of the max rate obtained during the cycle; Alternatively, switch when absolute rate equals a pre-set value. Alternatively, well is unable to sustain hydrocarbon flow (continuous or intermittent) by primary production against backpressure of gathering system or well is "pumped off" unable to sustain flow from artificial lift. Alternatively, well is out of sync with adjacent well cycles. | Switch when the instantaneous oil rate declines below the calendar day oil rate (CDOR) (e.g. total oil/total cycle length). Likely most economically optimal when the oil rate is at about 0.8 × CDOR. Alternatively, switch to injection when rate equals 20-40% of the max rate obtained during the cycle. |
| Gas rate | Switch to injection when gas rate exceeds the capacity of the pumping or gas venting system. Well is unable to sustain hydrocarbon flow (continuous or intermittent) by primary production against backpressure of gathering system with/or without compression facilities. | Switch to injection when gas rate exceeds the capacity of the pumping or gas venting system. During production, an optimal strategy is one that limits gas production and maximizes liquid from a horizontal well. |

TABLE 1-continued

Operating Ranges for a CSDRP.

| Parameter | Broader Embodiment | Narrower Embodiment |
| --- | --- | --- |
| Oil to Solvent Ratio | Begin another cycle if the OISR of the just completed cycle is above 0.15 or economic threshold. | Begin another cycle if the OISR of the just completed cycle is above 0.3. |
| Abandonment pressure (pressure at which well is produced after CSDRP cycles are completed) | Atmospheric or a value at which all of the solvent is vaporized. | For propane and a depth of 500 m, about 340 kPa, the likely lowest obtainable bottomhole pressure at the operating depth and well below the value at which all of the propane is vaporized. |

In Table 1, embodiments may be formed by combining two or more parameters and, for brevity and clarity, each of these combinations will not be individually listed.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of recovering hydrocarbons from an underground reservoir of the hydrocarbons, the method comprising:
   (a) injecting fluid, into the underground reservoir, comprising an emulsion and a viscosity-reducing solvent,
   (b) allowing the viscosity-reducing solvent to contact and at least partially dissolve into the hydrocarbons in the underground reservoir and reduce a viscosity of the hydrocarbons; and
   (c) producing reduced viscosity hydrocarbons from the underground reservoir;
   wherein the viscosity-reducing solvent has a viscosity at a reservoir pressure and temperature less than 1% of the viscosity of the hydrocarbons at the same pressure and temperature, the emulsion having an internal phase and an external phase, and the internal phase being substantially chemically inert with respect to components in the underground reservoir, and
   wherein the hydrocarbon recovery is by a cyclic solvent-dominated recovery process comprising injecting the emulsion and the viscosity-reducing solvent into a well completed in the underground reservoir, and then halting injection, and then producing at least a fraction of the emulsion, the viscosity-reducing solvent, and the hydrocarbons from the underground reservoir, and then halting production, and then repeating such cycles of injection and production.

2. The method of claim 1, wherein at least 25 mass % of the viscosity-reducing solvent in step (a) enters the underground reservoir as a liquid.

3. The method of claim 1, wherein at least 50 mass % of the viscosity-reducing solvent in step (a) enters the underground reservoir as a liquid.

4. The method of claim 1, wherein at least 50 mass % of the injected fluid excluding the internal phase of the emulsion comprises the viscosity-reducing solvent.

5. The method of claim 1, wherein at least 75 mass % of the injected fluid excluding the internal phase of the emulsion comprises the viscosity-reducing solvent.

6. The method of claim 1, wherein the injected viscosity-reducing solvent forms part of the emulsion.

7. The method of claim 1, wherein the external phase of the emulsion comprises the viscosity-reducing solvent.

8. The method of claim 1, wherein the hydrocarbons are a viscous oil having a viscosity of at least 10 cP at initial reservoir conditions.

9. The method of claim 1, wherein the viscosity-reducing solvent comprises ethane, propane, butane, pentane, heptane, hexane, octane, nonane, gas-condensate, a fraction of the reservoir hydrocarbons, carbon dioxide, or a combination thereof.

10. The method of claim 1, wherein the internal phase of the emulsion comprises an aqueous liquid.

11. The method of claim 10, wherein the internal phase of the emulsion has a pH between 5.0 and 9.0.

12. The method of claim 10, wherein the aqueous liquid comprises brine produced from the underground reservoir.

13. The method of claim 1, wherein the internal phase of the emulsion comprises a gas in a vapor state in the underground reservoir.

14. The method of claim 13, wherein the gas comprises $N_2$, $CO_2$, methane, or natural gas.

15. The method of claim 1, wherein the internal phase of the emulsion comprises at least 10 vol % of the emulsion at a pressure and temperature condition within the underground reservoir.

16. The method of claim 1, wherein at least 80 vol % of the internal phase of the emulsion comprises droplets or bubble inclusions less than 5 microns in diameter.

17. The method of claim 1, wherein the emulsion is at least partially stabilized through an addition of a surfactant.

18. The method of claim 1, wherein the emulsion is at least partially stabilized through an addition of clay or silica particles of less than 1 micron in maximum particle length.

19. The method of claim 1, wherein the emulsion is at least partially stabilized through an addition of asphaltenes or an asphaltic fraction obtained from recovered oil.

20. The method of claim 1, wherein the external phase of the emulsion comprises a polymer to increase a viscosity of the emulsion.

21. The method of claim 1, wherein the injection of the emulsion is effected in alternating fashion with injection of a non-emulsified viscosity-reducing solvent.

22. The method of claim 1, wherein the injection of the emulsion is effected after injection of a non-emulsified viscosity-reducing solvent.

23. The method of claim 21, wherein the non-emulsified viscosity-reducing solvent has a different composition than the viscosity-reducing solvent in the emulsion.

24. The method of claim 1, wherein the injection of the emulsion is effected at the end of non-emulsified viscosity-reducing solvent injection cycles.

25. The method of claim 1, wherein the injection and production are effected through a common wellbore.

26. The method of claim 1, wherein the cyclic solvent-dominated recovery process is a non-thermal recovery process.

27. The method of claim 1, wherein the emulsion is an aqueous-external, vapor-internal emulsion.

28. The method of claim 1, wherein the viscosity-reducing solvent comprises ethane, propane, butane, pentane, carbon dioxide, or a combination thereof.

29. The method of claim 1, wherein the viscosity-reducing solvent comprises greater than 50 mass % propane.

* * * * *